US008326800B2

(12) United States Patent
Cunningham et al.

(10) Patent No.: US 8,326,800 B2
(45) Date of Patent: Dec. 4, 2012

(54) SEAMLESS UPGRADES IN A DISTRIBUTED DATABASE SYSTEM

(75) Inventors: Conor John Cunningham, Austin, TX (US); Ajay Kalhan, Redmond, WA (US); Clifford T. Dibble, Bellevue, WA (US); Tomas Talius, Sammamish, WA (US); Santeri Olavi Voutilainen, Seattle, WA (US); Jeffrey A. East, Seattle, WA (US); Alexandre Verbitski, Woodinville, WA (US); Yixue Zhu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/051,967

(22) Filed: Mar. 18, 2011

(65) Prior Publication Data
US 2012/0239616 A1    Sep. 20, 2012

(51) Int. Cl.
G06F 17/30    (2006.01)
(52) U.S. Cl. ........................................ 707/610; 707/638
(58) Field of Classification Search .................. 707/610, 707/638
See application file for complete search history.

(56) References Cited

U.S. PATENT DOCUMENTS

| 6,212,557 | B1 | 4/2001 | Oran |
| 6,385,770 | B1 | 5/2002 | Sinander |
| 6,401,120 | B1 * | 6/2002 | Gamache et al. ............. 709/226 |
| 7,058,958 | B1 * | 6/2006 | Shutt et al. .................... 719/328 |
| 7,130,870 | B1 | 10/2006 | Pecina et al. |
| 7,383,281 | B1 | 6/2008 | Gutti et al. |
| 7,523,142 | B2 | 4/2009 | Driesen et al. |
| 7,711,702 | B2 * | 5/2010 | Smolen et al. ................. 707/715 |
| 7,711,703 | B2 * | 5/2010 | Smolen et al. ................. 707/609 |
| 7,716,181 | B2 * | 5/2010 | Todd ............................. 707/635 |
| 7,783,596 | B2 * | 8/2010 | Smolen et al. ................. 707/609 |
| 7,885,922 | B2 * | 2/2011 | Pareek et al. .................. 707/610 |
| 7,984,155 | B2 * | 7/2011 | Massa et al. ................... 709/226 |
| 8,150,812 | B2 * | 4/2012 | Todd ............................. 707/662 |
| 2002/0194015 | A1 * | 12/2002 | Gordon et al. .................... 705/1 |
| 2006/0130042 | A1 | 6/2006 | Dias et al. |
| 2008/0098046 | A1 | 4/2008 | Alpern et al. |
| 2009/0144720 | A1 | 6/2009 | Roush et al. |

OTHER PUBLICATIONS

Sameer Ajmani, Automatic Software Upgrades for Distributed Systems, Sep. 2004, (164 pages).
Tim Gorman, Choosing Among High-Availability Architectures in Oracle, Jan. 3, 2011 (Retrieved Date), (12 pages).
Mark Thomson, et al., ArcSDE to ArcGIS Server Basic, Jan. 3, 2011 (Retrieved Date), (19 pages).
Swapna Pallapinti, Oracle E-Business Suite: Upgrade to R12—A Functional View, Dec. 28, 2009, (4 pages).

* cited by examiner

Primary Examiner — Kim Nguyen
(74) Attorney, Agent, or Firm — Workman Nydegger

(57) ABSTRACT

Embodiments are directed to providing distributed database service upgrades of database server instances in a computer cluster using multiple database server instances and to monitoring and maintaining a distributed database service during upgrade. In an embodiment, each computer system in a computer cluster instantiates at least two different database server instances on each of the nodes in the cluster. The first database server instances are configured to operate using a current distributed database version and the second instances are configured to operate using a new, updated distributed database service version. The computer system receives an indication that the distributed database service is to be upgraded. Then, based on the received indication, the computer system migrates database replicas from the first database server instances to the second database server instances which operate the new, updated service version, substantially without user-visible downtime.

17 Claims, 5 Drawing Sheets

SEAMLESS UPGRADES IN A DISTRIBUTED DATABASE SYSTEM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client may interact with a web service using a web browser. The underlying data for the web service may be provided by a database server. The database server may be relied on by the user to provide web service data at any day or time. As such, performing database system updates without large amounts of downtime may be problematic.

BRIEF SUMMARY

Embodiments described herein are directed to providing distributed database service upgrades of database server instances in a computer cluster using multiple database server instances and to monitoring and maintaining a distributed database service during upgrade. In one embodiment, each computer system in a computer cluster instantiates at least two different database server instances on each of the nodes in the cluster. The first database server instances are configured to operate using a current distributed database version and the second instances are configured to operate using a new, updated distributed database service version. The computer system receives an indication that the distributed database service is to be upgraded. Then, based on the received indication, the computer system migrates database replicas from the first database server instances to the second database server instances which operate the new, updated service version, substantially without user-visible downtime.

In another embodiment, a computer system monitors and maintains a distributed database service upgrade process. The computer system identifies various operating portions of a distributed database service that are to be monitored. The identified operating portions represent potential points of failure for the distributed database service. The computer system monitors the identified operating portions to determine when and/or where a failure has occurred. The computer system determines whether failures have occurred in the operating portions and evaluates the identified failures to determine how to respond to the failures without outside intervention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an embodiment of the present invention in which service health checks are performed and acted on.

DETAILED DESCRIPTION

Figure 1:
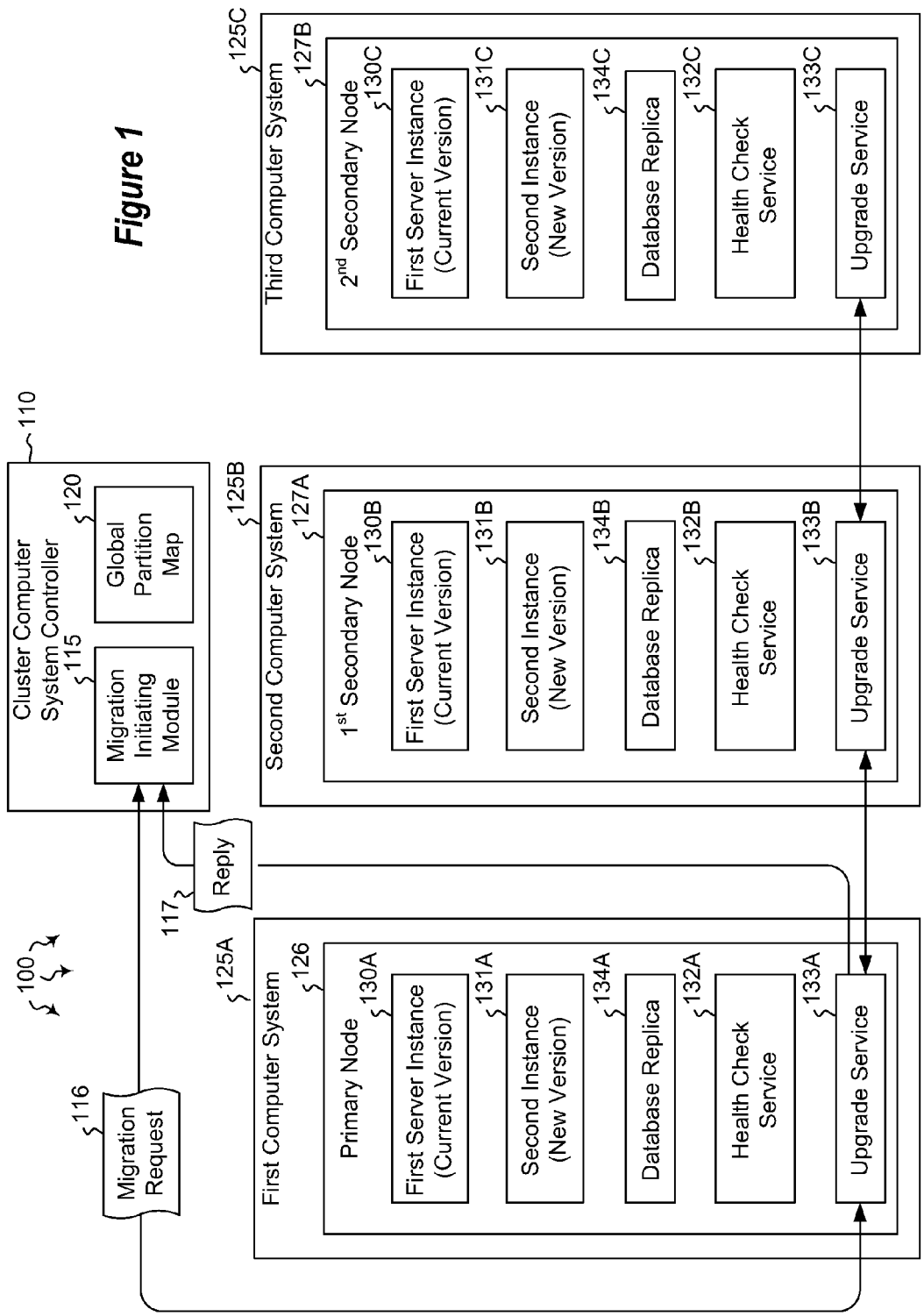
FIG. 1 illustrates a computer architecture in which embodiments of the present invention may operate including providing distributed database service upgrades using multiple database instances and monitoring and maintaining a distributed database service upgrade.

Embodiments described herein are directed to providing distributed database service upgrades of database server instances in a computer cluster using multiple database server instances and to monitoring and maintaining a distributed database service during upgrade. In one embodiment, each computer system in a computer cluster instantiates at least two different database server instances on each of the nodes in the cluster. The first database server instances are configured to operate using a current distributed database version and the second instances are configured to operate using a new, updated distributed database service version. The computer system receives an indication that the distributed database service is to be upgraded. Then, based on the received indication, the computer system migrates database replicas from the first database server instances to the second database server instances which operate the new, updated service version, substantially without user-visible downtime.

In another embodiment, a computer system monitors and maintains a distributed database service upgrade process. The computer system identifies various operating portions of a distributed database service that are to be monitored. The identified operating portions represent potential points of failure for the distributed database service. The computer system monitors the identified operating portions to determine when and/or where a failure has occurred. The computer system determines whether failures have occurred in the operating portions and evaluates the identified failures to determine how to respond to the failures without outside intervention. After evaluation, the computer system may perform actions to correct or compensate for the failure.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, SSD, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

The following terminology will be used in describing embodiments of the present invention: a "computer cluster" refers to a collection of cooperating computer systems, tied together with a network. A "computer system" (or "server") refers to a collection of memory, processors, disk, software, etc. A computer system is a node on the network. A "database" refers to a named logical collection of structured and unstructured data, together with metadata. A database has a version associated with it. A "replica" refers to a copy of the physical instantiation of the contents of a database. A "primary replica" refers to the replica currently receiving and servicing requests on behalf of clients. A "secondary replica" refers to one or more replicas slaved to a primary replica, receiving updates from the primary replica and applying them to the secondary, for the purpose of providing enhanced availability of the database contents. A "server instance" or "database server instance" refers to a software process which receives client requests and executes them, accessing (and potentially modifying) the contents of a database replica. A server instance has a version associated with it.

FIG. 1 illustrates a computer architecture 100 in which the principles of the present invention may be employed. Computer architecture 100 includes cluster computer system controller 110, as well as first, second and third computer systems 125A, 125B and 125C, respectively. Each of these computer systems participate in a computer cluster. The computer systems of the cluster are tied together by a network and host a set of (potentially) distributed databases. The cluster computer system includes migration initiating module 115. The migration initiation module may initiate a database upgrade or "migration" to a newer version. The database may include those computer systems shown in FIG. 1, as well as other computer systems. In some cases, the database will have secondary replicas (127A and 127B) for each primary node 126. While this diagram shows two secondary replicas, this can be configured for any number of secondary replicas per database. The secondary replicas may function as backup or failover replicas. The global partition map 120 may be configured to keep track where each portion (primary or secondary replicas) of database data is stored on the various computer systems.

The first computer system 125A, the second computer system 125B and the third computer system 125C may each have multiple database server instances running simultaneously. For example, in one embodiment, a primary node 126 may be running both a first server instance running a current database version and a second server instance (130A and 131A) running an upgraded database version. Secondary nodes 127A and 127B may similarly be running first and second server instances (130B/131B and 130C/131C) of current and upgraded database versions, respectively. Upon receiving migration request 116 from migration initiating module 115, the upgrade services (133A, 133B and 133C) of the respective computer systems may begin migrating the database replicas (134A-C) from the first server instance (130A-C) to the second server instance (131A-C). These upgrades may occur while the first server instance 130A-C is still responding to user requests for other database replicas.

As the data of the primary and secondary database replicas may be spread over multiple different computer systems, no individual computer system needs to be brought down. The database replica is upgraded on the second server instance while the first server instance is still running Once all replicas are successfully running with the new database version on the second server instance, the first server instance can be deleted.

In this manner, databases may be upgraded through the use of a second database server instance on each machine in a cluster. Downtime may be reduced or, in some cases, eliminated. Upgrade services 133A-C may further support logic to determine if each upgrade succeeds or fails, substantially (or entirely) without human intervention and controls the upgrade process. The upgrade service may indicate the current status of the upgrade to the user in reply 117. This status update may be provided on a periodic or continual basis.

Newer, updated versions (e.g. "New Version" N+1) of the database software may run alongside the original (e.g. "Current Version" N) software. This new instance is run side-by-side on the same hardware and supports upgrades of databases as opposed to upgrading individual computer systems. Thus, an upgrade path is available that prepares each of the computer systems 125A-C (i.e. it installs and starts the new version N+1 software alongside existing current version N software). The system then migrates each database (primary replica+secondary replicas) to the new server instance running version N+1, repeating for each database.

This approach may minimize the number of requirements on the database server software related to upgrades. In some cases, this may lower the cost of performing upgrades in a consolidated highly available cluster model. For example, pre-existing upgrade code paths may be leveraged that already exist in the stand-alone database server. At least in some cases, this approach may eliminate the need to build specialized secondary "cluster aware" upgrade code paths inside the database server (which may require multi-version protocol support, etc.). Moreover, this approach may use a database migration service at the cluster level to configure and orchestrate a set of database servers and migration requests in such a way as to achieve a highly available upgrade leveraging one or more existing upgrade capabilities of the individual database server instances.

During the upgrade process, the resources of the computer systems 125A-C can be managed such that performance objectives are met for each application. Each database server instance may incorporate a resource governance mechanism to limit the maximum resources used by each database. This may be updated during the migration process when a database is moved from an old server instance to a new one. Additionally, the two resource governance mechanisms may communicate to understand the decisions of the other database server's resource governor.

In some embodiments, the primary and secondary database replicas 134A-134C may be each respectively detached from each current version N instance and attached to a new version N+1 instance on the same computer system. In other embodiments, secondary replicas may be moved to the new version N+1 first, but continue to apply changes from the current version N primary replica. If the secondary replicas are up-to-date, the system may fail over to one of the secondaries and then upgrade the primary replica to the new version N+1 (or rebuild it if it fails to upgrade completely). If a majority of the replicas failed during the upgrade and are not up-to-date, the replicas may be detached and reattached to the current version N database server instances. The upgrade may then be aborted and possibly retried again at a later time.

In another embodiment, additional replicas of the database are initially created as secondary replicas on new version N+1 server instances. The system then fails over from the version N replicas, en masse, to the version N+1 replicas (making one version N+1 the new primary replica and the other version N+1 replicas the new secondaries). Finally, the version N replicas are dropped. This approach implements twice as many copies of the data, but only for each database actively being moved. It also provides very high uptime and redundancy. In some cases, this approach may implement additional replicas of the database as secondaries on new version N+1 servers, but the servers are different computer systems. This can allow migration from one machine to another during upgrade.

In some embodiments, the following workflow may be implemented: 1) Deploy a new image to all computer systems in cluster 110. The image may have both the new and old versions of the database server software. Both the new and the old (version N) binaries would start up with all databases attached to the old database server instance. 2) Wait for deployment to fully complete. 3) Ensure a second server instance is running on each node with version N+1 software. This may be accomplished by querying a global database directory. 4) Set a placement advisor to enter dual mode. New databases are created on the new server instances. 5) Enumerate pre-existing databases and begin migration to new version N+1 server instance. As space and time permits, migrate one or multiple databases at a time.

Continuing the workflow, 6) Each database migration involves either a move or copy: A) Invoke a move/copy application programming interface (API) on the global database directory), B) The placement advisor) chooses destination nodes. Local (e.g. intra-rack) migration may be used, C) The upgrade services will orchestrate the migration. They may be configured to handle errors during this process, D) If migration succeeds, the database migration service (DMS) (i.e. migration initiating module 115) calls the health check API on the destination database on the version N+1 database server instance. If the check fails or the migration fails, then DMS will abort the upgrade or pause it for human intervention. 7) DMS does fix up of various catalogs if required 8) Once the databases in the cluster have been upgraded, the old version N instance will be empty, and 9) A later deployment may remove the old bits and instance. Until then, the old server instance may remain active. The concepts above will be explained further below with regard to methods 200 and 300 of FIGS. 2 and 3.

Figure 2:
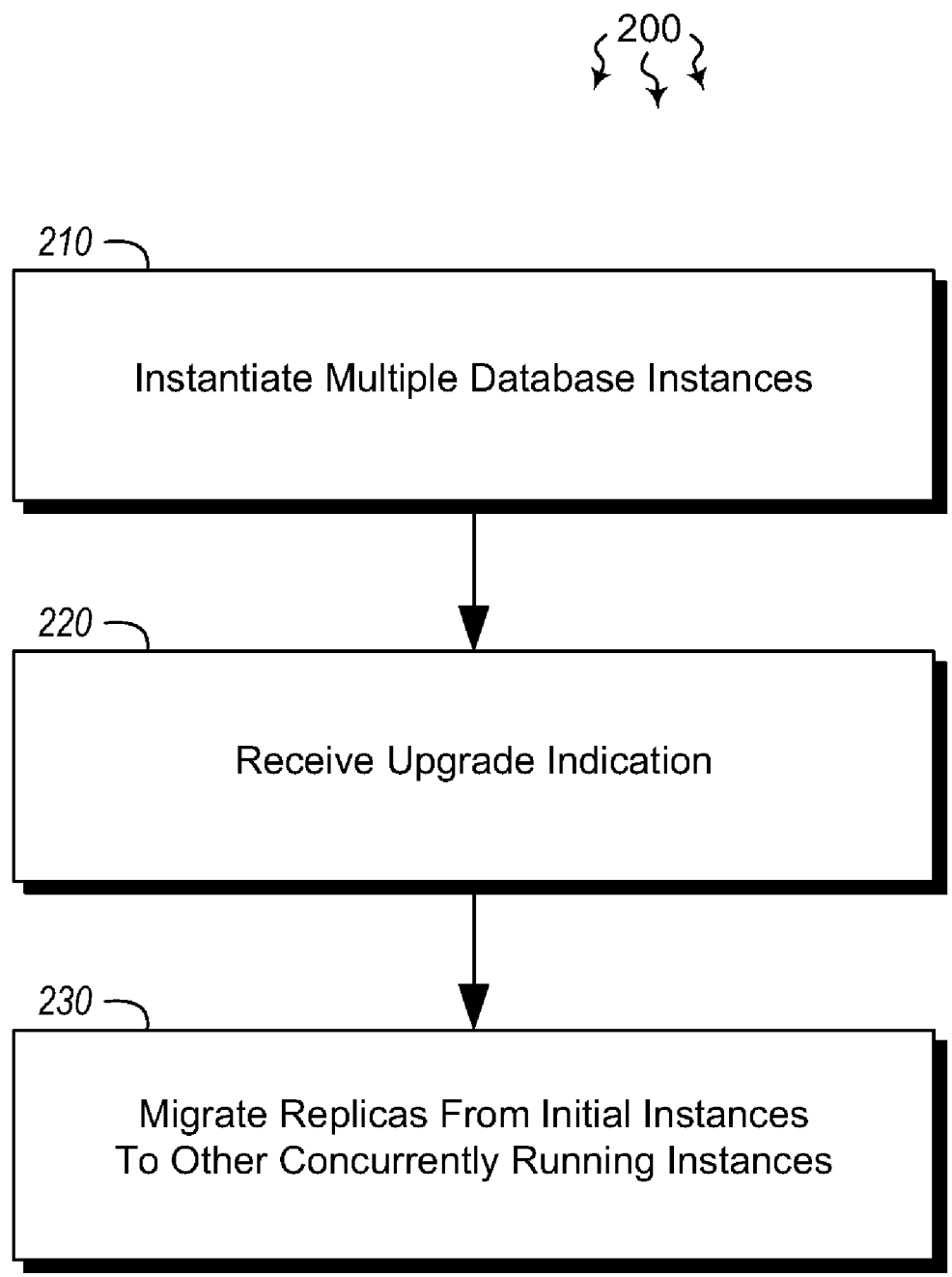
FIG. 2 illustrates a flowchart of an example method for providing distributed database service upgrades using multiple database instances.
Figure 3:
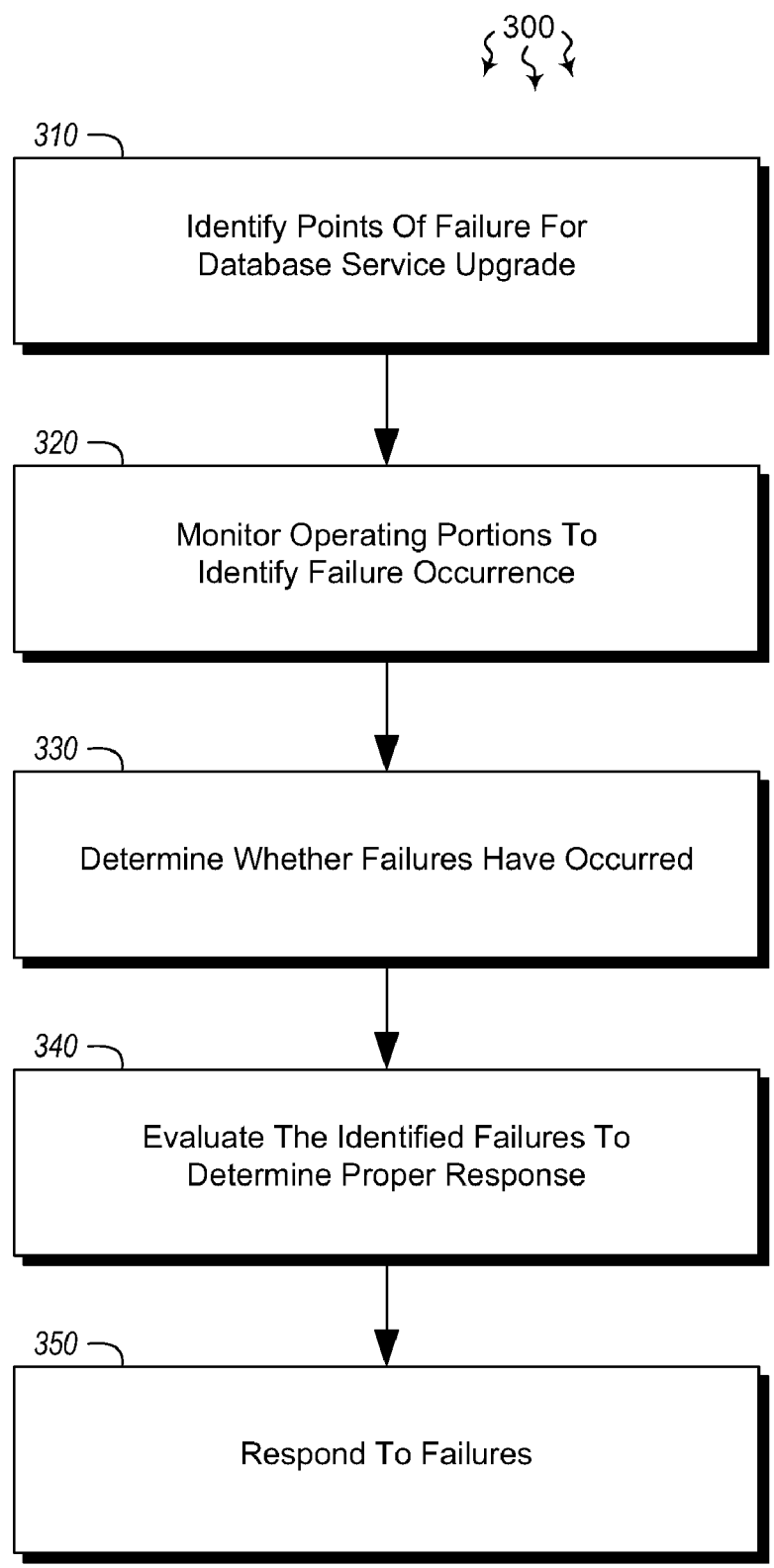
FIG. 3 illustrates a flowchart of an example method for monitoring and maintaining a distributed database service upgrade.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing distributed database service upgrades using multiple database instances. The method 200 will now be described with frequent reference to the components and data of environment 100.

Method 200 includes an act of instantiating a plurality of first and second database server instances on one or more computer systems in a database cluster, wherein the first database server instances are configured to operate using a current distributed database service version and the second database server instances are configured to operate using a new distributed database service version (act 210). For example, cluster computer system controller 110 may instantiate first and second server instances 130A and 131A on primary node 126 (on computer system 125A), as well as first and second server instances 130B/131B and 130C/131C on first and second secondary nodes 127A and 127B (on computer systems 125B and 125C). The first server instances 130A-C may be configured to operate using a current version N while the second server instances 131A-C may be configured to operate using a new version N+1.

In some cases, the first computer system 125A may include one or more primary replicas 134A and one or more secondary replicas that correspond to different databases. Similarly, each computer system in the cluster may include substantially any number of replicas. The database primary replica 134A continually sends changes to the first and second secondary replicas 134B and 134C. The upgrade service 133A may indicate that the primary and secondary replicas are to begin using an updated version of the database software. The upgrade service 133A may provide one or more guarantees including failover guarantees (i.e. that, upon failure, the system will seamlessly fail over to a backed-up version) and load-balancing guarantees (i.e. that data will be substantially evenly distributed among available nodes).

In some cases, the cluster computer system controller 110 may manage a plurality of databases. The cluster computer system may be configured to move these databases between computer systems. The cluster computer system may further be configured to instantiate database software instances on nodes in a shared-nothing distributed computing system. A shared-nothing distributed computing system ensures that each hardware device in the distributed system has a backup and that no one device can be a point of failure. Thus, each of the principles described above can be implemented in a shared-nothing distributed computing system.

Method 200 includes an act of receiving an indication that the distributed database service is to be upgraded (act 220). For example, upgrade service 133A may receive migration request 116 which indicates that the database is to be upgraded from a current version N to a new version N+1.

Method 200 also includes, based on the received indication, an act of migrating replicas from the first database server instances to the second database server instances, substantially without user-visible downtime (act 230). For example, upgrade services 133A-C may migrate replicas from the first server instances 130A-C to the second server instances 131A-C. Both instances are running simultaneously. This model also applies when there are substantially any number of replicas for a database. Thus, the migration of the database software can go from one running version to another running version.

In some cases, the health check services 132A-C of the distributed database may include logic that determines whether an upgrade succeeded or failed, substantially (or entirely) without human intervention. The health check service may monitor the upgrade process and detect whether hardware or software errors have occurred. If an error has occurred, the health check service can attempt to resolve the error or can pause the upgrade for user intervention if it cannot resolve the error.

In some cases, the migration from the first server instance to the second server instance may occur on the same computer system (e.g. on primary node 126). In such cases, data movement between computer systems is avoided. In other cases, the migration from the first server instance to the second server instance may occur on multiple computer systems. This allows database migration to different computer systems.

In some embodiments, processing resources may be governed across the first and second server instances (130A-C and 131A-C), so that the distributed database service conforms with one or more existing service level agreements. The service level agreements may specify a certain level of processing that is to be provided to a user. Accordingly, a processing resource governing mechanism may be used to distribute resources as needed to comply with a service agreement. In some cases, the service level agreements may be migrated in synch with the distributed database service. Thus, when a portion of data is transferred to the second server instance, the second server instance receives a corresponding increase in processing resources. For instance, if 10% of the data is transferred to the second server instance, 10% of the processing resources may also be transferred to the second server instance.

In other embodiments, the first replica 134A of the primary node and the first and second secondary replicas 134B and 134C may be detached from the current server instance and then later re-attached to the second server instances of the primary node and the first and second secondary nodes. These second server instances are configured to operate using the new distributed database service version N+1. In other embodiments, the first and second secondary replicas may be moved to the second server instances of the first and second secondary nodes which are configured to operate using the new distributed database service version N+1. Then, the primary replica may fail over to at least one of the secondary replicas. Once all replicas have been upgraded, the primary server instance may then be removed. The database system may also create additional replica copies as secondary replicas operating the new distributed database service version. The database system may then fail over the first and second secondary replicas running on server instances at version N to the additional secondary replicas running at version N+1 and remove the version N replicas.

Figure 4:
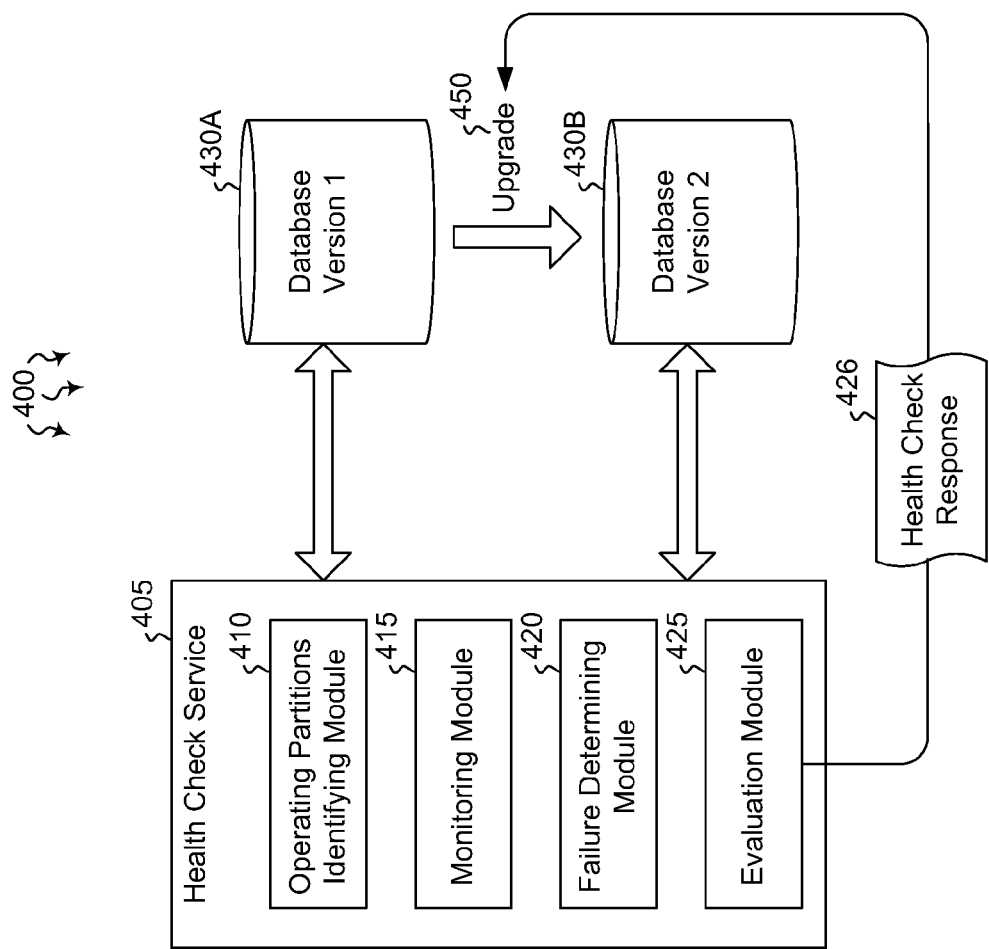

Turning now to FIG. 3, FIG. 3 illustrates a flowchart of a method 300 for monitoring and maintaining a distributed database service upgrade. The method 300 will now be described with frequent reference to the components and data of environments 100 and 400 of FIGS. 1 and 4, respectively.

Method 300 includes an act of identifying one or more operating portions of a distributed database service upgrade that are to be monitored during the distributed database service upgrade, wherein the identified operating portions represent potential points of failure for the distributed database service upgrade (act 310). For example, operating portions identifying module 410 of health check service 405 may identify operating portions of a distributed database service upgrade that are to be monitored during the distributed database service upgrade 450. The identified operating portions represent points of failure for the distributed database service upgrade. These points of failure may be hardware- or software-related. The operating portions may include events, processes and/or execution points.

Method 300 includes an act of monitoring the identified operating portions to determine at least one of when and where a failure has occurred (act 320). For example, monitoring module 415 may monitor those operating portions identified by module 410 to determine when and/or where a failure has occurred during the upgrade. The monitoring module may monitor any or all of the identified operating portions, and may be configured to monitor new operating portions as requested by an administrator.

Method 300 includes an act of determining that one or more failures have occurred in one or more of the operating portions (act 330). For example, failure determining module 420 may determine that various failures have occurred in one or more of the operating portions during the upgrade from database version 1 (430A) to database version 2 (430B).

Method 300 includes an act of evaluating the identified failures to determine how to respond to the failures without outside intervention (act 340). For example, evaluation module 425 may receive health check response 426 and, based on that response, may evaluate the failures to determine how to respond to the failure(s). The evaluation module may make the evaluation and act on it without outside intervention. In some cases, the determined response may be automatically implemented to resolve the failures and allow the distributed database service upgrade 450 to continue upgrading (act 350). In cases where the evaluation module cannot adequately respond to the failure, it may pause the upgrade until an outside entity can resolve the issue.

Figure 5:
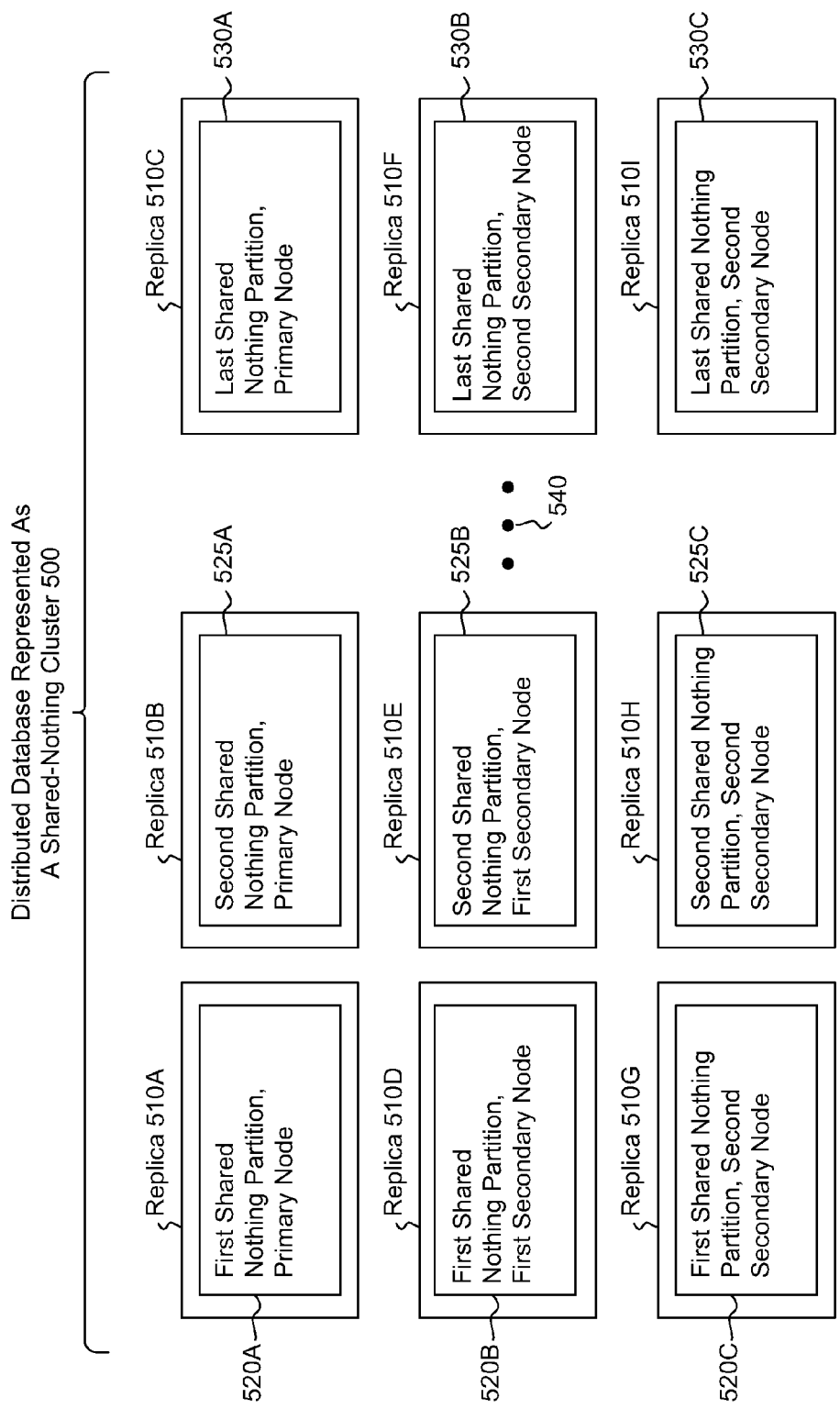
FIG. 5 illustrates an embodiment in which a shared-nothing database architecture is implemented.

In another embodiment, as illustrated in FIG. 5, the database may be represented using multiple computer servers as a shared-nothing cluster 500 instead of a single server. The logical database is separated into physical partitions (e.g. 525A-C, 525A-C and 530A-C) that, when combined, hold the contents of the complete database. As shown in element 540 of FIG. 5, substantially any number of partitions and/or replicas may be used. The partitions are stored as replicas (e.g. replicas 510A-I) and can be stored on multiple different computer systems. Additionally, each replica has primary replica copies and one or more secondary copies to maintain a highly available service. User operations against the logical database may appear to have a single system image, such that the customer may not see the partitions or that the logical database is split across multiple partitions.

An upgrade of a shared-nothing clustered database may include performing the steps of method 300 against each partition at the same time. In some cases, the N primary replicas, the N first secondary replicas and the N second secondary replicas may be detached from the first server instances running the current software version and attached to the second instances running the upgraded software version. In other cases, the N first and N second secondary replicas may be detached from the first server instances and attached to the second server instances on each respective node. Then, the N primary replicas are detached from the first server instances to the second server instances on each respective node.

Thus, methods, systems and computer program products are provided which provide distributed database service upgrades using multiple, simultaneously running database server instances. Moreover, methods, systems and computer program products are provided which monitor and automatically resolve issues that may occur during a distributed database service upgrade.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a distributed database system including at least one processor and a memory, in a computer networking environment including a plurality of computing systems, a computer-implemented method for providing distributed database service upgrades using multiple database server instances, the method comprising:

an act of instantiating a plurality of first and second database server instances on each of a plurality of computer systems in a database cluster, including a primary node and at least a first secondary node, wherein the first database server instances are each running a current distributed database service version and the second database server instances are simultaneously each running a new distributed database service version;

an act of receiving an indication that the distributed database service is to be upgraded;

based on the received indication, an act of migrating database replicas from the first database server instances to the second database server instances, substantially without user-visible downtime and by performing at least moving first and second secondary replicas to the second server instances of the first and second secondary nodes which are configured to operate using the new distributed database service version;

failing over a role of a primary replica to at least one secondary replica; and upgrading the primary replica to the new distributed database service version by moving from the first server instance to the second server instance running the new distributed database service version.

2. The method of claim 1, wherein the first computer system includes one or more primary replicas and one or more secondary replicas that correspond to different databases.

3. The method of claim 1, wherein the database primary replica continually sends changes to the first and second secondary replicas.

4. The method of claim 1, wherein the distributed database service provides at least one of the following: failover guarantees and load-balancing guarantees.

5. The method of claim 1, wherein database replicas managed by the distributed database service move between computer system clusters.

6. The method of claim 1, wherein the distributed database service comprises logic that determines whether the upgrade succeeded or failed without human intervention.

7. The method of claim 1, wherein the replica of the primary node and the first and second secondary replicas are detached from the current distributed database service version and are re-attached to the second server instances of the primary node and the first secondary node and a second secondary node that are configured to operate using the new distributed database service version.

8. The method of claim 1, further comprising:

creating one or more additional replicas of the database as secondary replicas operating the new distributed database service version;

failing over the primary replica and first and second secondary replicas to the additional secondary nodes; and removing the primary replica and first and second secondary replicas.

9. The method of claim 1, wherein the migration from the first server instance to the second server instance occurs on the same computer system, such that data movement between computer systems is avoided.

10. The method of claim 1, wherein the migration from the first instance to the second server instance occurs on a plurality of computer systems to allow database migration to different computer systems.

11. The method of claim 1, wherein processing resources are governed across the first and second server instances such that the distributed database service conforms with one or more existing service level agreements.

12. The method of claim 11, wherein the one or more service level agreements are migrated in synch with the distributed database service such that when a portion of data is transferred to the second instance, the second instance receives a corresponding increase in processing resources.

13. A computer program product for implementing a method for monitoring and maintaining a distributed database service upgrade process, the computer program product comprising one or more computer-readable storage media having stored thereon computer-executable instructions that, when executed by one or more processors of the computing system, cause the computing system to perform the method, the method comprising:

an act of identifying one or more operating portions of a distributed database service that are to be monitored, wherein the identified operating portions represent potential points of failure for the distributed database service;

an act of monitoring the identified operating portions to determine at least one of when and where a failure has occurred;

an act of determining that one or more failures have occurred in one or more of the operating portions; and an act of evaluating the identified failures to determine if the computing system is capable of responding to the failures without outside intervention, wherein upon determining the computing system is capable of responding to the failures without outside intervention, the computing system automatically implements a determined response to resolve the failures and to allow the distributed database service to continue operating, or alternatively, upon determining the computing system is incapable of responding to the failures without outside intervention, the computing system temporarily pauses the distributed database service.

14. The computer program product of claim 13, wherein the operating portions include at least one of events, processes and execution points.

15. A distributed computer system comprising the following:

one or more processors;

system memory;

one or more computer-readable storage media having stored thereon computer-executable instructions that, when executed by the one or more processors, causes the computing system to perform a method for providing distributed database service upgrades using multiple database instances, the method comprising the following:

an act of instantiating, for each partition in the distributed database system, first and second server instances on a first node in a shared-nothing distributed computing system, first and second server instances on a first database secondary node in the shared-nothing distributed computing system, and first and second server instances of a second database secondary node in the shared-nothing distributed computing system, wherein the first instances are configured to operate using a current distributed database service version and the second instances are configured to operate using a new distributed database service version;

an act of receiving an indication that the distributed database service is to be upgraded; and based on the received indication, an act of migrating each replica of each partition in the database, wherein the migration includes migrating from the first server instance of the primary node to the second server instance of the primary nodes on the first node in the shared-nothing distributed computing system, migrating the first server instance of the first secondary nodes to the second server instance of the first secondary node on the second nodes in the shared-nothing distributed computing system, and migrating the first server instance of the second secondary nodes to the second server instance of the second secondary nodes on the third node in the shared-nothing distributed computing system, substantially without user-visible downtime.

16. The system of claim 15, wherein processing resources are governed across the first and second instances such that the distributed database service conforms with one or more existing service level agreements.

17. The system of claim 16, wherein the one or more service level agreements are migrated in synch with the distributed database service such that when a portion of data is transferred to the second instance, the second instance receives a corresponding increase in processing resources.

* * * * *